(12) United States Patent
Friauf et al.

(10) Patent No.: US 7,882,329 B2
(45) Date of Patent: *Feb. 1, 2011

(54) CANCELLATION OF INDIVIDUAL LOGICAL VOLUMES IN PREMIGRATION CHAINS

(75) Inventors: Cheryl Marie Friauf, Tucson, AZ (US); Norie Iwasaki, Kanagawa (JP); Yuuji Kibuse, Tokyo (JP); Gregory Tad Kishi, Oro Valley, AZ (US); Koichi Masuda, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 623 days.

This patent is subject to a terminal disclaimer.

(21) Appl. No.: 11/860,367

(22) Filed: Sep. 24, 2007

(65) Prior Publication Data

US 2009/0083346 A1 Mar. 26, 2009

(51) Int. Cl.
*G06F 12/00* (2006.01)
(52) U.S. Cl. .................. 711/203; 711/117; 711/154; 711/170; 719/324
(58) Field of Classification Search ............... 711/113, 711/117, 154, 162, 170, 203; 719/324
See application file for complete search history.

(56) References Cited

U.S. PATENT DOCUMENTS

| | | | |
|---|---|---|---|
| 6,067,599 A | 5/2000 | Kishi et al. | |
| 6,889,302 B2 | 5/2005 | Gibble et al. | |
| 6,895,466 B2 | 5/2005 | Gibble et al. | |
| 6,938,120 B2 | 8/2005 | Gibble et al. | |
| 6,978,325 B2 | 12/2005 | Gibble et al. | |
| 2005/0256999 A1 | 11/2005 | Kishi et al. | |
| 2006/0149898 A1 | 7/2006 | Bello et al. | |
| 2006/0271754 A1 | 11/2006 | Shibayama et al. | |

OTHER PUBLICATIONS

US Patent application entitled "Cancellation of Individual Logical Volumes in Premigration Chains", Serial No. unknown, filed Sep. 24, 2007, by inventors C.M. Friauf, N. Iwasaki, Y. Kibuse, G.T. Kishi and K. Masuda.

*Primary Examiner*—Yong Choe
(74) *Attorney, Agent, or Firm*—Janaki K. Davda; Konrad Raynes & Victor LLP (57) ABSTRACT

Provided are techniques for cancellation of premigration of a member in a chain. A set of premigration messages are received, wherein a separate premigration message is received for each logical volume in a chain of logical volumes. While processing the premigration messages in order of receipt of each of the premigration messages, a cancel message indicating that premigration of a logical volume in the chain is to be cancelled is received. In response to determining that the logical volume whose premigration is to be cancelled has not already been transferred to physical storage media, premigration of the logical volume is cancelled by removing a premigration message for that logical volume from the set of premigration messages and premigration of each other logical volume in the chain of logical volumes is continued in order of receipt.

12 Claims, 10 Drawing Sheets

CANCELLATION OF INDIVIDUAL LOGICAL VOLUMES IN PREMIGRATION CHAINS

RELATED APPLICATION

This application is related to the following commonly assigned and co-pending U.S. patent application Ser. No. 11/860,361, filed on Sep. 24, 2007, entitled "CANCELLATION OF INDIVIDUAL LOGICAL VOLUMES IN PREMIGRATION CHAINS", by Cheryl M. Friauf et al., and which is incorporated herein by reference in its entirety.

BACKGROUND

1. Field

Embodiments of the invention relate to cancellation of individual logical volumes in premigration chains.

2. Description of the Related Art

In a virtual tape storage system, a host system coupled to cache (e.g., in the form of hard disk storage) and an automated tape library is used to emulate tape drives and tape cartridges (also referred to as "tapes"). In this way, the host system performing Input/Output (I/O) operations to tape is in fact performing I/O operations to the cache emulating the tape storage. Logical volumes in cache are written to physical volumes on the tape cartridges. Typically, multiple logical volumes are stored on each physical volume.

A Virtual Tape Server (VTS) receives and processes I/O operations from the host systems. Premigration may be described as moving data from the cache to a tape cartridge to make room in the cache.

A typical logical volume is written to disk virtual volume cache 180 and "closed" or "rewound and unloaded". At that time, premigration is scheduled (queued) for the logical volume. At some later, appropriate time, the queued premigration requests are processed (e.g., it may be hours later) as part of a chain. At some later time (e.g., hours or days), the logical volume is removed from the disk virtual volume cache 180 to free space.

Currently, a premigration command specifies a chain of individual logical volumes that are to be premigrated to provide efficient data transfer. For example, the chain may include logical volumes "A, B, C, D, E, F". With chaining, the logical volumes "A, B, C, D, E, F" all go onto the same tape sequentially and there is no need for physical tape load/unload during the chain. It may take several minutes to transfer data in the chain to the tape cartridge. During this period of time, one of the volumes that was placed on the chain may have to have its transfer cancelled. In such a case, the premigration of the chain is stopped (i.e., any logical volumes in the chain that have not already been transferred are not transferred). For example, if premigration of logical volume "D" is to be cancelled before logical volume "D" has been premigrated, then any logical volumes that have already been transferred to tape cartridge have been successfully premigrated (e.g., logical volumes "A, B, C"), and any logical volumes that have not already been transferred to tape cartridge (e.g., "E, F") are not transferred (i.e., their premigration fails). In this scenario it may be said that the chain "breaks" at logical volume "D".

Since logical volumes "E, F" should be premigrated, a separate premigration command is issued for these logical volumes.

Thus, there is a need in the art for improved processing of premigration chains.

SUMMARY OF EMBODIMENTS OF THE INVENTION

Provided are a computer program product and system for cancellation of premigration of a member in a chain. A set of premigration messages are received, wherein a separate premigration message is received for each logical volume in a chain of logical volumes. While processing the premigration messages in order of receipt of each of the premigration messages, a cancel message indicating that premigration of a logical volume in the chain is to be cancelled is received. In response to determining that the logical volume whose premigration is to be cancelled has not already been transferred to physical storage media, premigration of the logical volume is cancelled by removing a premigration message for that logical volume from the set of premigration messages and premigration of each other logical volume in the chain of logical volumes is continued in order of receipt.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments allow cancellation of specific logical volumes within a chain of logical volumes that are to be premigrated.

Figure 1:
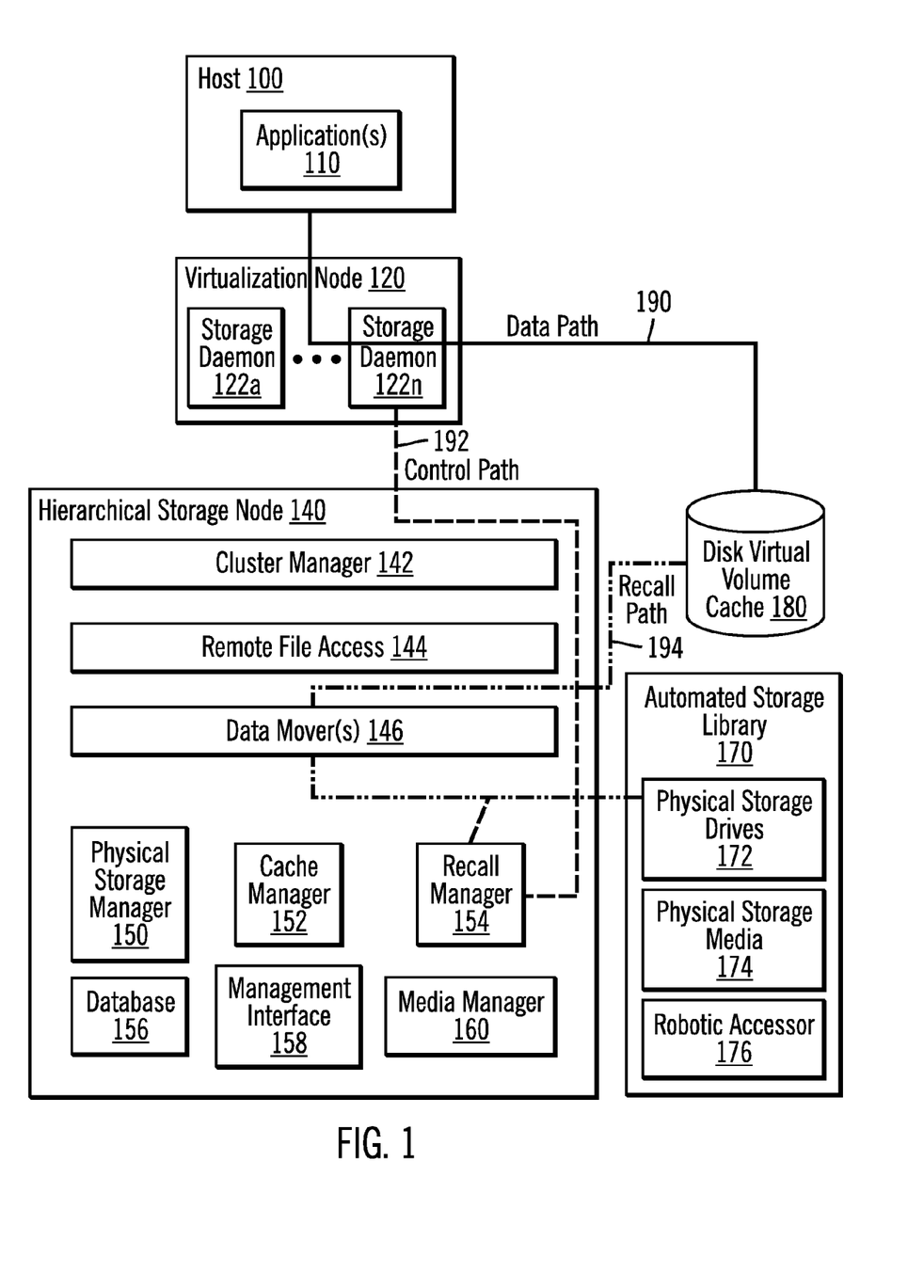
FIG. 1 illustrates details of a computing architecture in accordance with certain embodiments.

FIG. 1 illustrates details of a computing architecture in accordance with certain embodiments. The host 100 is coupled to a virtualization node 120. The virtualization node 120 is coupled to a hierarchical storage node 140 and a disk virtual volume cache 180. The hierarchical storage node 140 is coupled to the disk virtual volume cache and to an automated storage library 170. Each coupling may be by, for example, a network. A network may comprise any type of network, such as, for example, a peer-to-peer network, spoke and hub network, Storage Area Network (SAN), a Local Area Network (LAN), Wide Area Network (WAN), the Internet, an Intranet, etc.

The host 100 may be a mainframe computer and executes one or more applications 110. The host 100 initiates and runs storage jobs on a virtual storage subsystem as if the as if the virtual devices (tape daemons 122a . . . 122n) were tape drives (e.g., an IBM® 3490 tape drive, IBM is a trademark of International Business Machines Corporation in the United States, other countries, or both).

The virtualization node 120 includes storage daemons 122a . . . 122n (where the suffixes "a" and "n" and the ellipses are used to indicate that there may be any number of storage daemons). Each storage daemon 122a . . . 122n emulates a physical storage drive (e.g., an IBM® 3490 tape drive) to the host 100, but actually operates on a file (e.g., that represents a logical volume) that is either on the local disk virtual volume cache 180 or operates on a file in a remote cluster's disk virtual volume cache through remote file access 144 (which may be a remote file access server).

The automated storage library 170 includes physical storage drives 172 (e.g., tape drives), physical storage media 174 (e.g., tape cartridges that may be inserted into the tape drives), and a robotic accessor 176 that inserts the physical storage media 174 into the physical storage drives 172 and extracts the physical storage media 174 from the physical storage drives 172.

The hierarchical storage node 140 includes a cluster manager 142, remote file access 144, one or more data movers 146, physical storage manager 150, cache manager 152, recall manager 154, database 156, management interface 158, and media manager 160.

The cluster manager 142 (also referred to as a GRID) coordinates operations between clusters (e.g., the components of FIG. 1 from a cluster).

The remote file access 144 provides a link to the local disk virtual volume cache 180 for access by a remote cluster.

Each data mover 146 controls actual data transfer operations for copies performed between clusters and transfers of data between physical storage media 174 and the disk virtual volume cache 180.

The physical storage manager 150 controls (i.e., manages) the physical storage media 174 (e.g., tapes). The physical storage manager 150 manages the physical storage media in multiple pools, controls reclamation, borrow/return of volumes from a common scratch pool, and movement of physical storage media 174 between pools. A pool may be described as a grouping of a subset of the physical storage media 174 (e.g., if there are eight tapes, then these may be divided into two pools, each with four tapes). Data written to the physical storage media 174 in the automated storage library 170 is managed by pools. Each host volume may be written to one of the different data pools (e.g., one of 32 different data pools).

The cache manager 152 controls the copying of data from the disk virtual volume cache 180 to the physical storage media 174 and the subsequent removal of the redundant copy of data in the disk virtual volume cache 180. The cache manager 152 also provides control signals to balance data flow between the different components and the disk virtual volume cache 180. The management interface 158 provides information about a system (e.g. a specific cluster or linked clusters) and allows user control and configuration of the system.

The disk virtual volume cache 180 contains logical volumes (also referred to as virtual volumes) being operated on and stores additional logical volumes for rapid access.

The recall manager 154 queues and controls recalls of data into the disk virtual volume cache 180 from the physical storage media 174 for either storage daemons 122a . . . 122b or copies requested by the cluster manager 142.

The media manager 160 manages the handling of the physical storage media 174 and error recovery. The media manager 160 diagnoses errors and determines whether the errors are caused by the physical storage drives 172 or the physical storage media 174 and takes appropriate action.

In FIG. 1, data flows on data path 190 between host 110 and disk virtual volume cache 180 via storage daemon 122b. The storage daemon 122b is able to store data into the disk virtual volume cache 180 for the host 100.

Also, the storage daemon 122b is able to retrieve data from the disk virtual volume cache 180 for the host 100. In particular, if data requested by the host 100 is missing from the disk virtual volume cache 180 (i.e., there is a "cache miss"), recall may be performed to move data from the automated storage library 170 to the disk virtual volume cache 180 on recall path 194. When a mount request comes to a storage daemon 122b, the storage daemon 122b instructs the recall manager 154 (on control path 192) to recall data. The recall manager 154 instructs a data mover 146 to recall the data for a logical volume into the disk virtual volume cache 180 prior to access by the storage daemon 122b. Then, the storage daemon 122b is able to retrieve data from the disk virtual volume cache 180 and send the data to the host 100.

Figure 2:
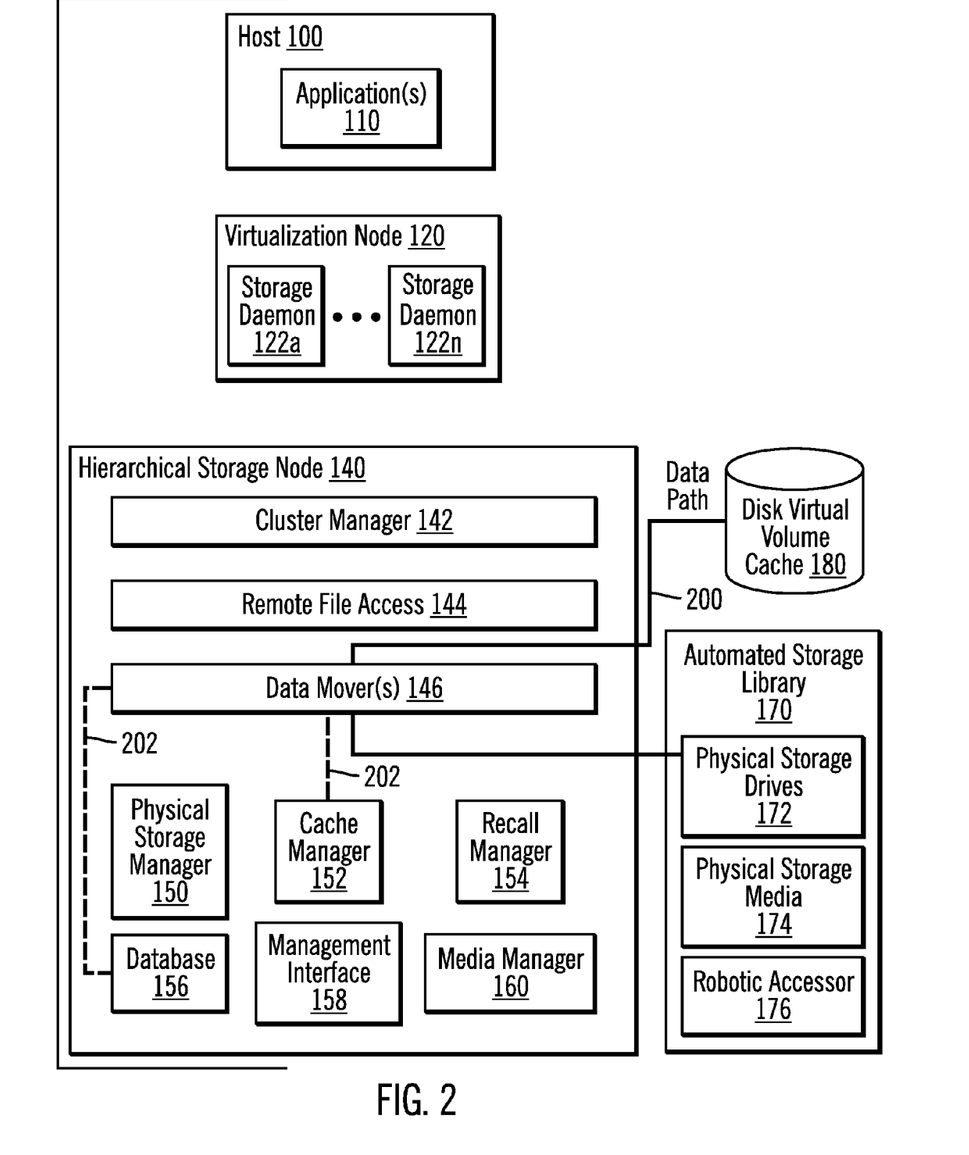
FIG. 2 illustrates premigration in accordance with certain embodiments.

FIG. 2 illustrates premigration in accordance with certain embodiments. Premigration may be described as moving data from the disk virtual volume cache 180 to physical storage media 174 to free space in the disk virtual volume cache 180. As new data is stored in the disk virtual volume cache 180, this version of the new data may be referred to as a "resident file" and no other copy exists of the version of the new data. Based on cache management rules, the cache manager 152 selects logical volumes for copying to physical storage media 174 and requests (on control path 202) a data mover 146 to copy the logical volumes from the disk virtual volume cache 180 physical storage media 174 and to update the database 150 with the name of the physical storage media 174 and location on the physical storage media 174. The data mover 146 moves logical volumes along data path 200 from the disk virtual volume cache 180 to a physical storage medium 174 that is mounted in a physical storage drive 172. The data mover 146 communicates with the database 150 over control path 202 (i.e., an internal communications path such as a Transmission Control Protocol/Internet Protocol (TCP/IP) loopback and/or shared memory). Based on cache management rules, the cache manager 152 also selects logical volumes that are premigrated for removal from the disk virtual volume cache 160. The cache manager 152 requests the data mover 146 to remove the logical volumes from the disk virtual volume cache 160 and update the database 150. When a file is resident in the disk virtual volume cache 160, the database 150 says "copy in cache". When a file is premigrated, the database 150 says "copy in cache and on physical volume Pxxx at location Lyyy". When the file is removed from the disk virtual volume cache 160, the database 150 is updated to say "not in cache and still on physical volume Pxxx at location Lyyy."

Embodiments provide a new function in a data mover 146 coupled to a Virtual Tape Server (VTS) (e.g., similar in nature to an IBM® 3494 B20 Virtual Tape Server) (IBM is a trademark of International Business Machines Corporation in the United States, other countries, or both). A VTS includes a virtualization node 120, a hierarchical storage node 140, and a disk virtual volume cache 180. The storage daemons 122a . . . 122b of the virtualization node 120 are responsible for emulating (virtualizing) storage devices on a host channel and performing I/O operations with the disk virtual volume cache 180. The hierarchical storage node 140 components are responsible for managing the data between the disk virtual volume cache 180 and the physical storage media 174.

Embodiments provide improved premigration efficiency when individual premigrates (i.e., logical volumes) are canceled.

Figure 3:
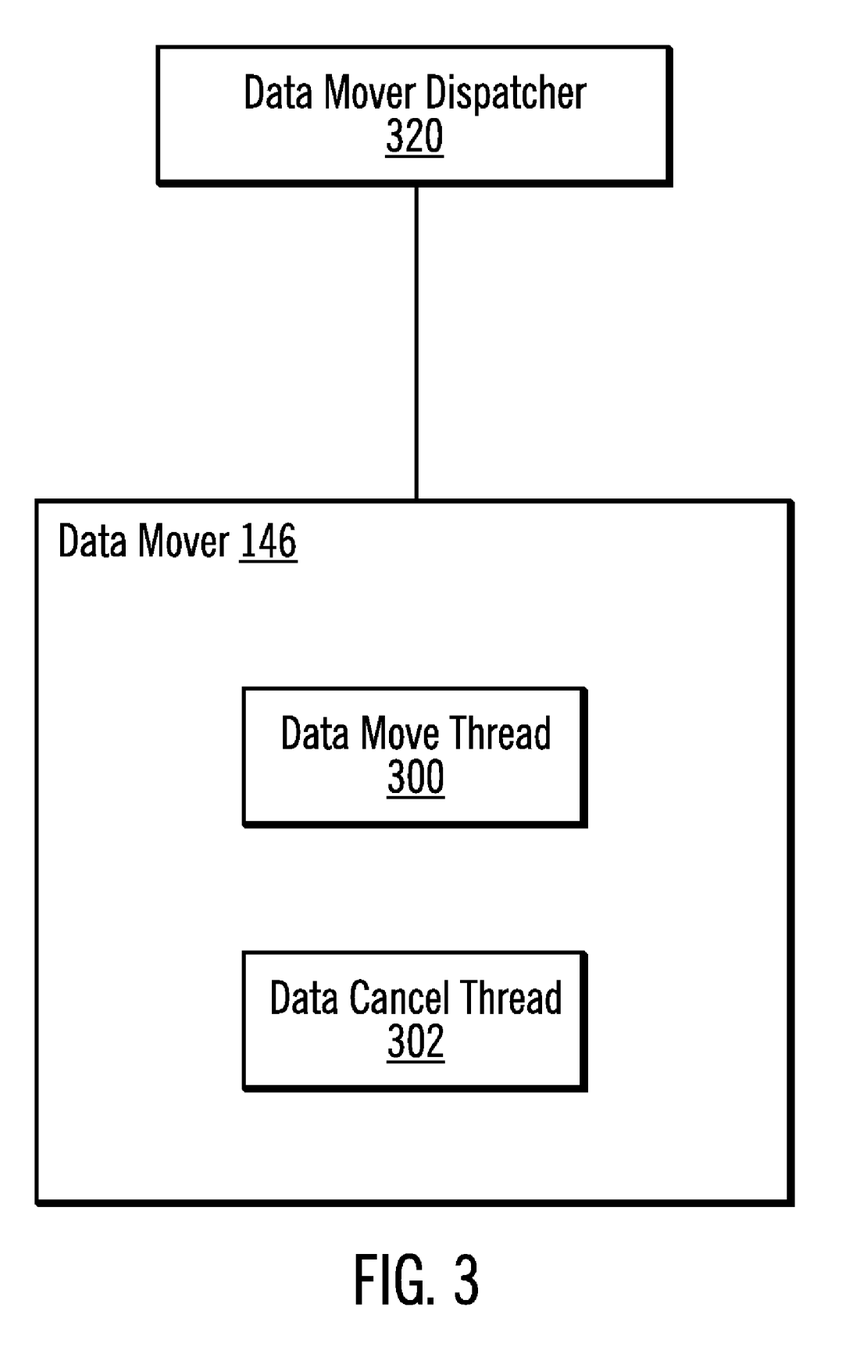
FIG. 3 illustrates further details of a data mover in accordance with certain embodiments.

FIG. 3 illustrates further details of a data mover 146 in accordance with certain embodiments. The data mover 146 includes a data move thread 300 for moving data and a data cancel thread 302 for canceling premigration of a particular logical volume. Optionally, the data mover 146 is coupled to a data mover dispatcher 320 that instructs multiple instances of the data mover 146 to perform data movement.

There are may be many cases in which the application 110 at the host 100 requests access to a logical volume after the logical volume was written to the disk virtual volume cache 180. In such cases, premigration is cancelled both to (1) prevent access collisions with the logical volume in the disk virtual volume cache 180 between the storage daemon 122a . . . 122n and the premigration being done by the data mover 146 and (2) prevent the VTS from premigrating "stale" data in case the logical volume is modified by the current host 100 access. Therefore, when an asynchronous host 100 request is made to use a logical volume in the disk virtual volume cache 180, the VTS has to cancel any premigrations in progress or queued for operation. Because of the length of time required to write a chain of volumes, this collision occurs often enough that an efficient way of dealing with it is useful.

Figure 4:
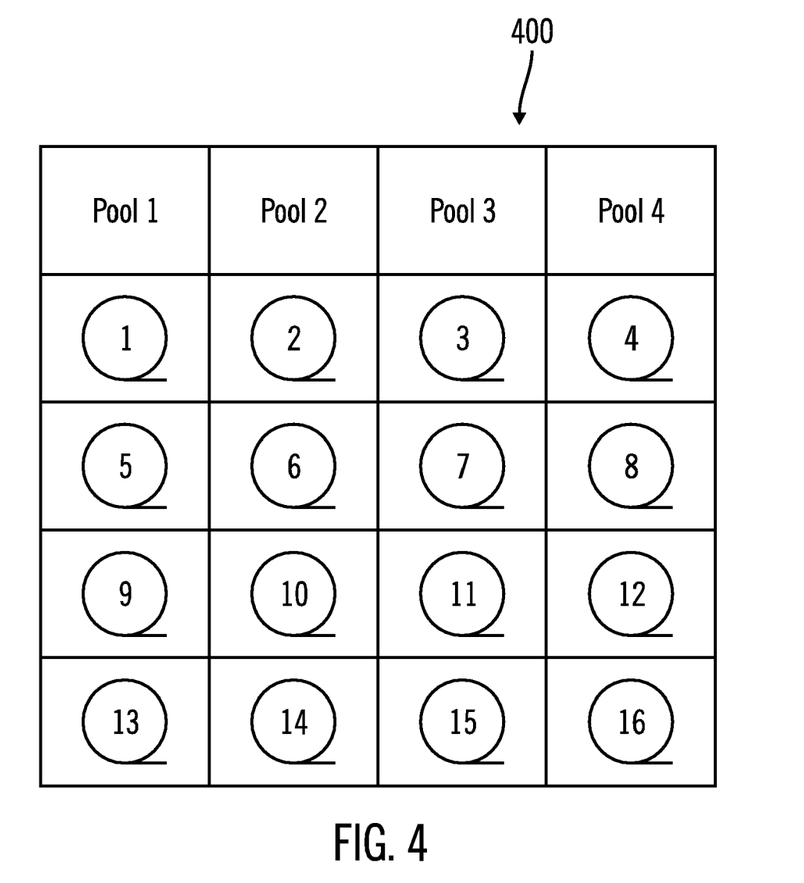
FIG. 4 illustrates logical volumes in pools in accordance with certain embodiment.

FIG. 4 illustrates logical volumes in pools 400 in accordance with certain embodiment. In FIG. 4, there are four pools, and each pool includes four logical volumes. In certain embodiments, the numeric value of a logical volume represents a Least Recently Used (LRU) order.

Figure 5A:
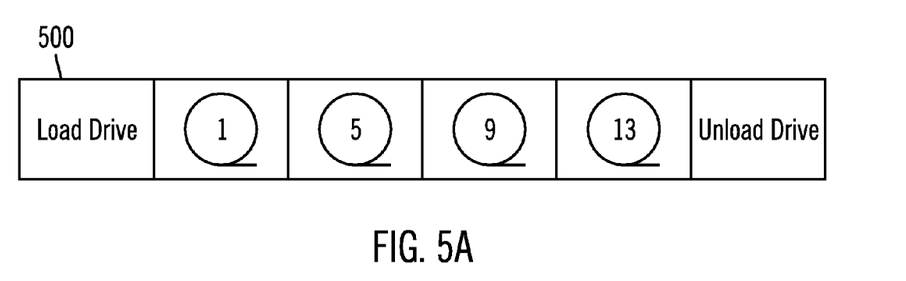
FIGS. 5A and 5B illustrate cancellation of a logical volume that is to be premigrated in accordance with certain embodiments.
Figure 5B:
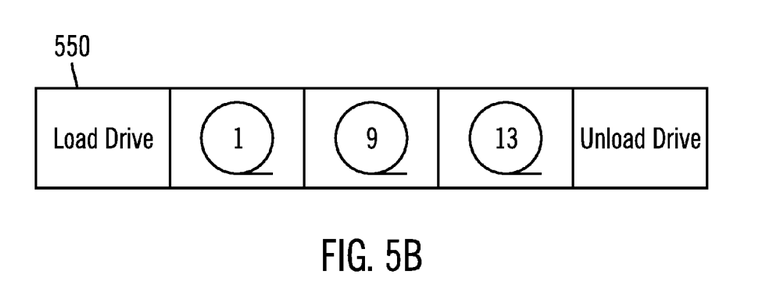

FIGS. 5A and 5B illustrate cancellation of a logical volume that is to be premigrated in accordance with certain embodiments. In FIG. 5A, the sequence 500 of actions starts with a physical storage drive 172 being loaded. Then, logical volumes 1, 5, 9, and 13 are to be premigrated. Next, the physical storage drive 172 is to be unloaded. In this example, premigration of logical volume 5 is cancelled. In FIG. 5B, the cancellation results in the sequence 550 of actions in which logical volumes 1, 9, and 13 are premigrated. Thus, even though a logical volume in a chain of logical volumes to be premigrated is cancelled, the cancellation does not impact the premigration of other logical volumes in the chain.

Efficient data transfer is provided by "chaining" a series of logical volume writes from the disk virtual volume cache 180 to a physical volume on a physical storage media 174 selected from a pool, eliminating the mount/unmount operations associated with pool switching. Also, the longer the chain, the more efficient the transfer.

For example, a chain may include logical volumes "A, B, C, D, E, F". In this example, if premigration of logical volume "D" is to be cancelled before logical volume "D" has been premigrated, then any logical volumes that have already been transferred to tape cartridge have been successfully premigrated (e.g., logical volumes "A, B, C"), and any logical volumes that have not already been transferred to tape cartridge (e.g., "E, F") are also premigrated. Thus, embodiments allow the chain to not transfer logical volume "D" but continue on to transfer logical volumes "E, F". In addition, multiple transfers can be canceled without disrupting other members in the chain.

Figure 6:
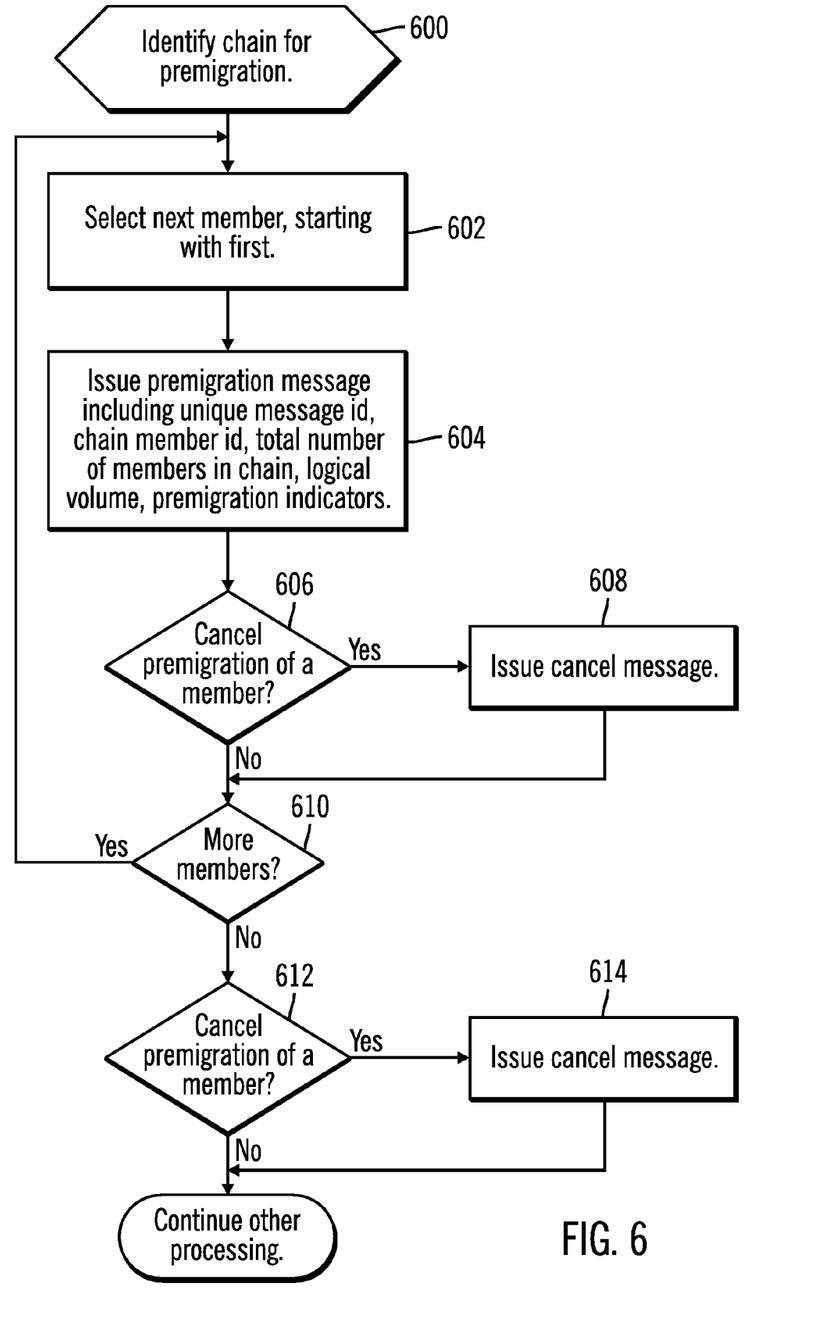
FIG. 6 illustrates logic performed by a cache manager in accordance with certain embodiments.

FIG. 6 illustrates logic performed by a cache manager 152 in accordance with certain embodiments. Control begins at block 600 with the cache manager 152 identifying a chain for premigration. In block 602, the cache manager 152 selects a next member in the chain, starting with a first member. In block 604, the cache manager 152 issues a premigration message that includes a unique message identifier ("id") shared by all messages in the chain, a chain member identifier ("id") (e.g., a chain member number), a total number of members in the chain, a logical volume identifier, and premigration indicators (e.g., special handling flags, such as a flag that indicates whether the logical volume is being written for a primary copy or a backup copy). In block 606, the cache manager 152 determines whether premigration of a member in the chain should be cancelled. If so, processing continues to block 608, otherwise, processing continues to block 610.

In block 608, the cache manager 152 issues a cancel message. In certain embodiments, the cancel request identifies the logical volume of the member whose premigration has been cancelled. From block 608, processing continues to block 610. In block 610, the cache manager 152 determines whether there are more members to premigrate. If so, processing loops back to block 602, otherwise, processing continues to block 612. In block 612, the host may again determine whether premigration of a member in the chain is to be cancelled. If so, processing continues to block 614, otherwise, the host continues 100 with other processing. In block 614, the cache manager 152 issues a cancel message. Although the logic illustrates that the cache manager 152 determines whether to issue a cancel message after block 604 or block 610, the cache manager 152 may make this determination any time during processing (after the premigration message has been issued for the member whose premigration is to be cancelled).

Figure 7:
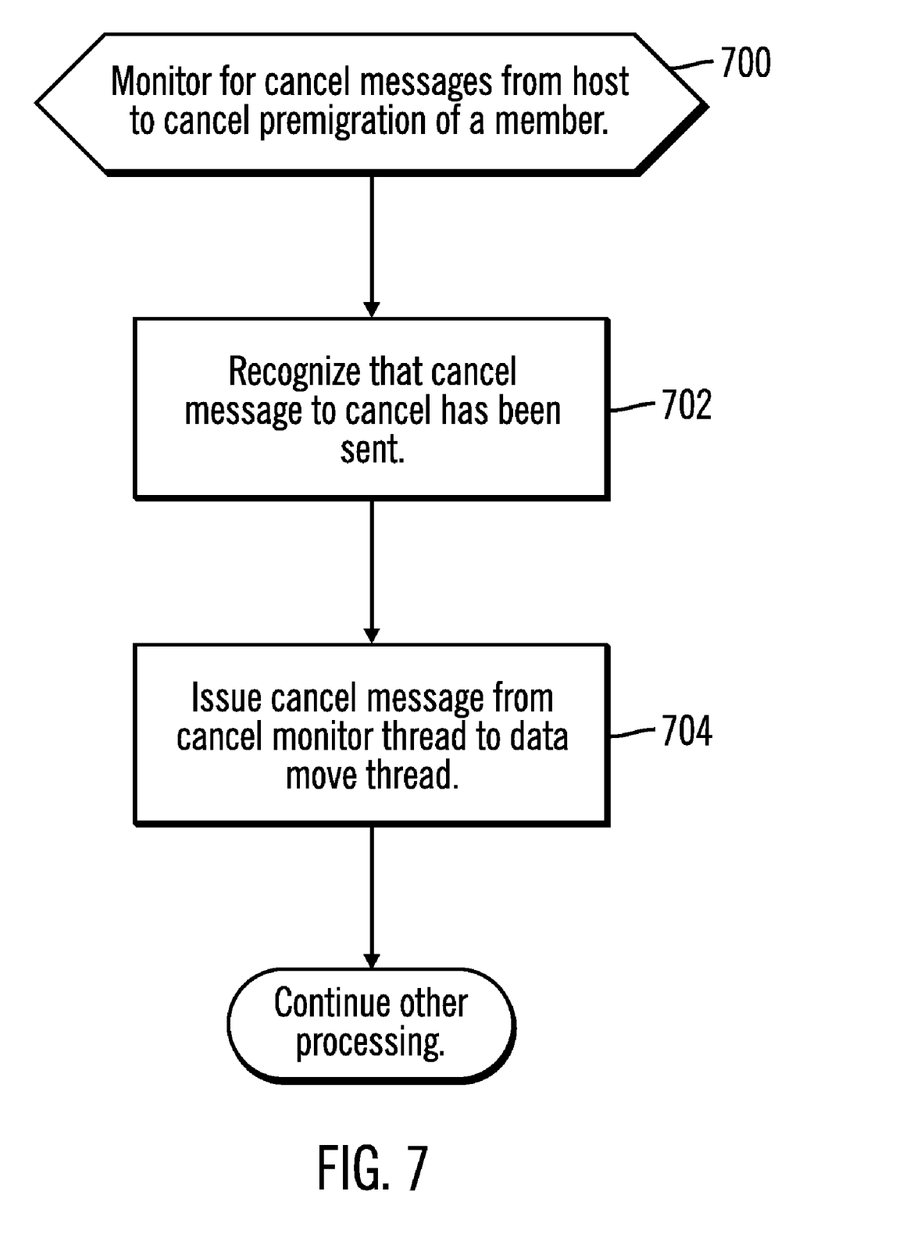
FIG. 7 illustrates logic performed by a data cancel thread in accordance with certain embodiments.

FIG. 7 illustrates logic performed by a data cancel thread 302 in accordance with certain embodiments. Control begins at block 700 with the data cancel thread 302 monitoring for cancel messages from host 100 to cancel premigration of a member. In block 702, the data cancel thread 302 recognizes that the host 100 has issued a cancel message to cancel premigration of a member of a chain. In block 704, the data cancel thread 302 issues a cancel message to the data move thread 300, then the data cancel thread 302 continues other processing (which may include monitoring as in block 700).

Figure 8A:
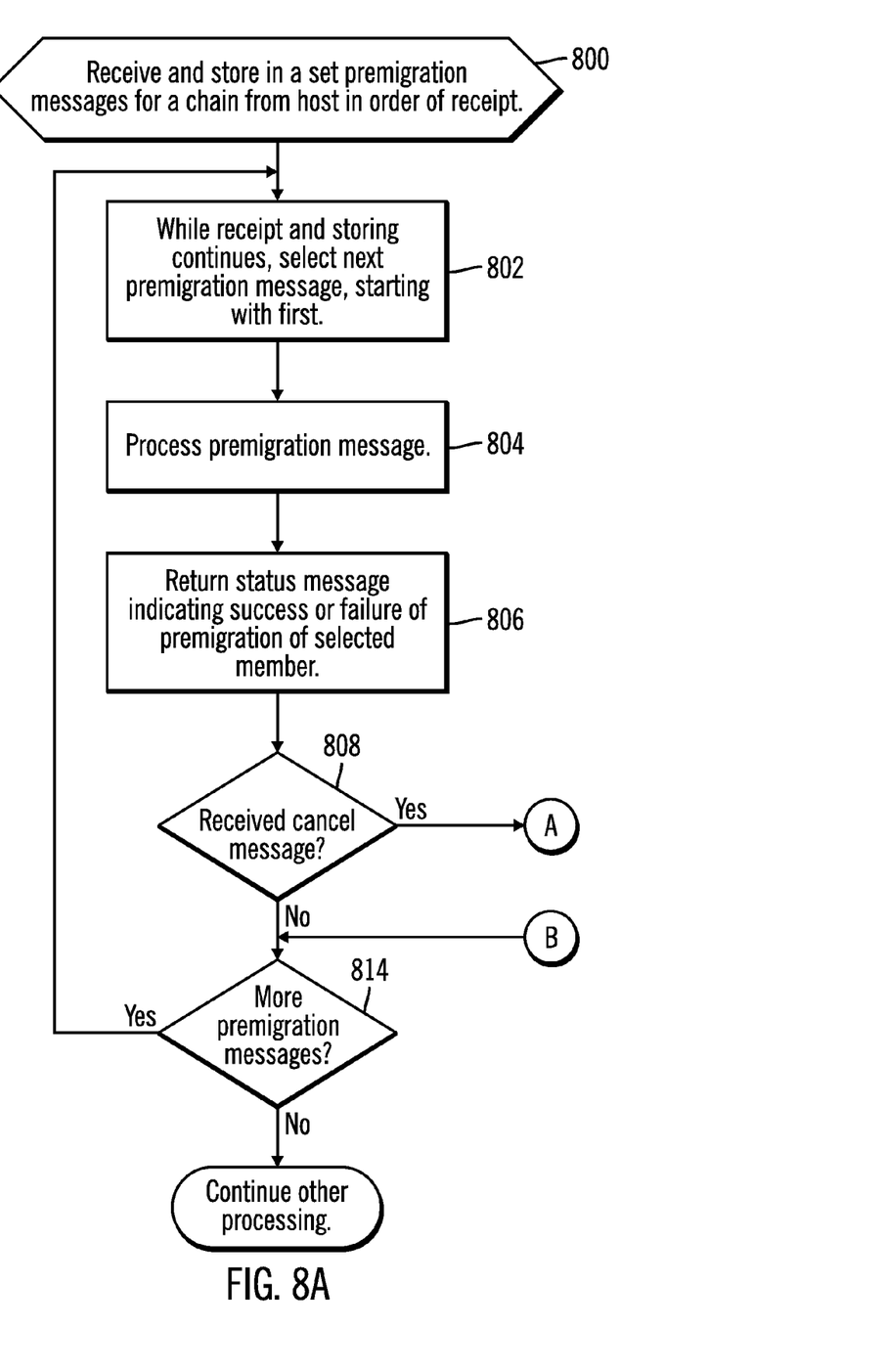
FIGS. 8A and 8B illustrate logic performed by a data move thread in accordance with certain embodiments.
Figure 8B:
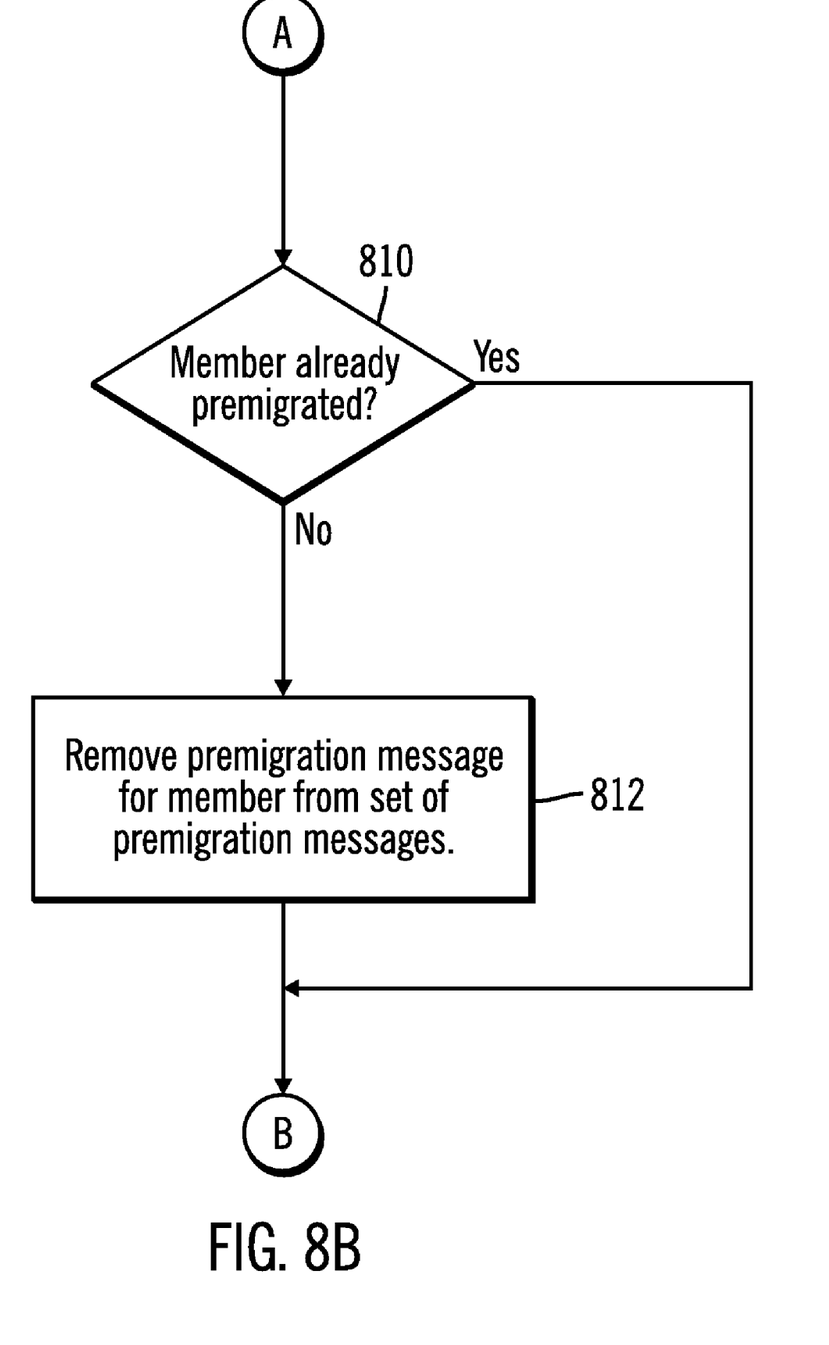

FIGS. 8A and 8B illustrate logic performed by a data move thread 300 in accordance with certain embodiments. In block 800, the data move thread 300 receives and stores in a set (e.g., stacks in a stack or a inserts into a queue) premigration messages for a chain from the host 100 in order of receipt (e.g., 1 through N, where N is a positive integer). In block 802, while receipt and storing of premigration messages continues, the data move thread 300 selects a next premigration message in the stack, starting with a first premigration message. In block 804, the data move thread 300 processes the premigration message (i.e., performs the premigration of the logical volume specified in the premigration message by transferring the logical volume from disk virtual volume cache 180 to physical storage media 174). When the data move thread 300 fills up one physical storage medium 174 (e.g., a tape cartridge), a next physical storage medium 174 is chosen, and the data move thread 300 premigrates to this next physical storage medium 174. In block 806, the data move thread returns a status message indicating a success or failure of the premigration of the selected member and, if failure, a reason for the failure (e.g., "premigration failed because it was canceled for logical volume D". In certain embodiments, the status message indicates that premigration occurred even though a cancel message was issued, and such a status message may be out of order in the sequence of status messages returned. In block 808, the data move thread 808 determines whether a cancel message has been received from the data cancel thread 302. If so, processing continues to block 810 (FIG. 8B), otherwise, processing continues to block 814. Although the logic illustrates that the data move thread 300 determines whether a cancel message has been received after block 806, the data move thread 300 may make this determination any time during processing.

In FIG. 8B, in block 810, the data move thread 300 determines whether the member identified in the cancel message has already been premigrated. If so, processing continues to block 816, otherwise, processing continues to block 812. In block 812, the data move thread removes the premigration message for the member identified in the cancel message from the set of stored premigration messages for the chain. From block 812, processing continues to block 814 (FIG. 8A).

In block 814, the data move thread 300 determines whether there are more premigration messages to be processed for the chain. If so, processing loops back to block 802, otherwise, the data move thread 300 continues other processing.

Thus, embodiments provide a distributed system (e.g., a VTS) that allows for internal cancellation of premigration of logical volumes within a middle of a chain. Also, instead of issuing a request to premigrate a number of logical volumes, embodiments issue a series of requests, with one request per logical volume (e.g., Transfer "A", then transfer "B", then transfer "C", etc.). The requests are received and processed in order. Also, each request has an individual success/failure message and reason. Thus, if premigration of a particular logical volume in a chain is canceled, and that member has not already been written to a physical storage medium 174, the individual request for that logical volume is failed, but other requests for the chain are still processed in order. This allows multiple individual logical volume premigrations to be cancelled in a chain without failing other logical volume premigrations in the chain, maintaining data transfer efficiency.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals. Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 6, 7, 8A, and 8B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 6, 7, 8A, and 8B may be implemented in software, hardware, programmable and non-programmable gate array logic or in some combination of hardware, software, or gate array logic.

Figure 9:
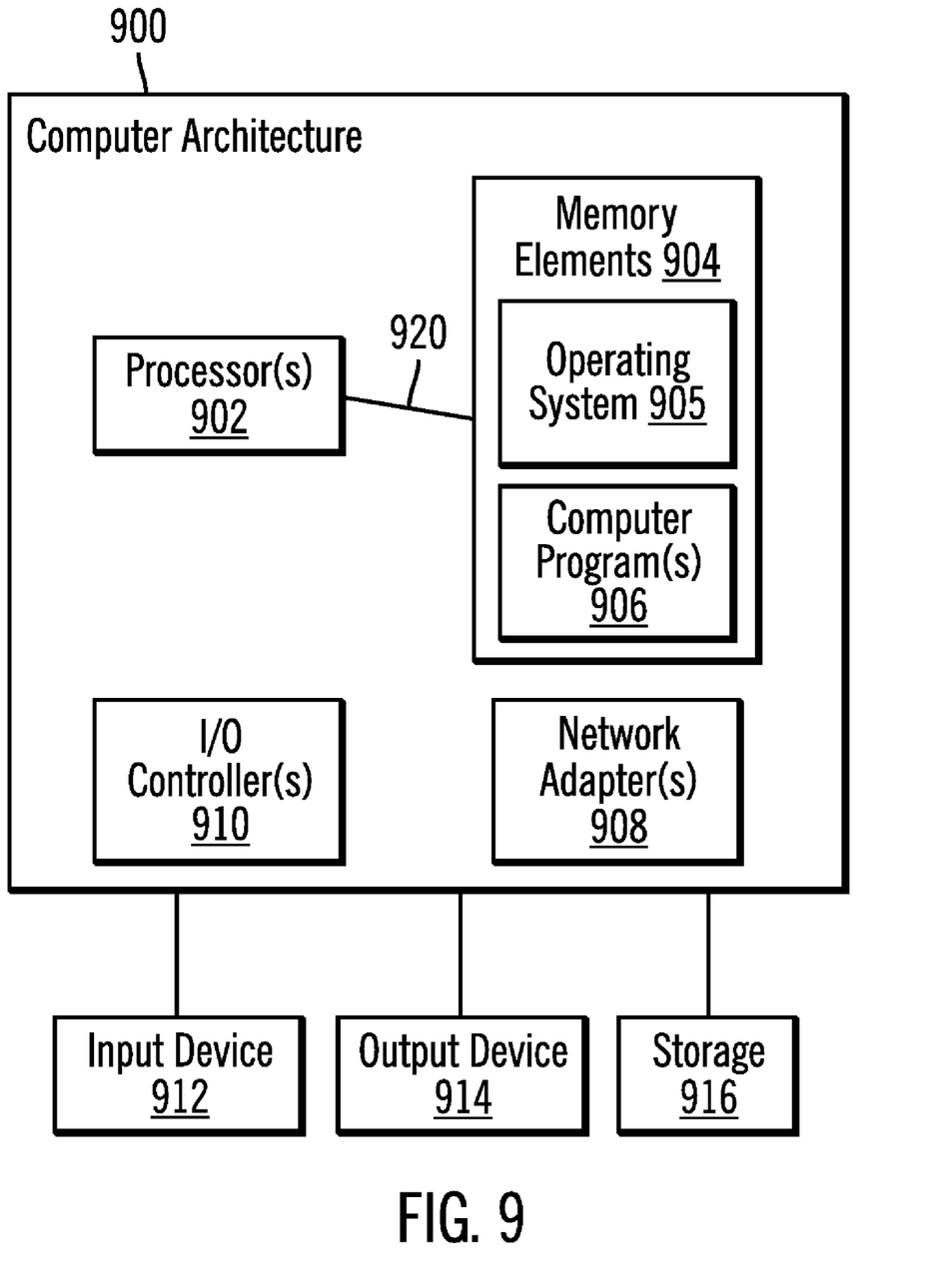
FIG. 9 illustrates a system architecture that may be used in accordance with certain embodiments.

FIG. 9 illustrates a system architecture 900 that may be used in accordance with certain embodiments. Virtualization node 120 and/or hierarchical storage node 140 may implement system architecture 900. The system architecture 900 is suitable for storing and/or executing program code and includes at least one processor 902 coupled directly or indirectly to memory elements 904 through a system bus 920. The memory elements 904 may include local memory employed during actual execution of the program code, bulk storage, and cache memories which provide temporary storage of at least some program code in order to reduce the number of times code must be retrieved from bulk storage during execution. The memory elements 904 include an operating system 905 and one or more computer programs 906.

Input/Output (I/O) devices 912, 914 (including but not limited to keyboards, displays, pointing devices, etc.) may be coupled to the system either directly or through intervening I/O controllers 910.

Network adapters 908 may also be coupled to the system to enable the data processing system to become coupled to other data processing systems or remote printers or storage devices through intervening private or public networks. Modems, cable modem and Ethernet cards are just a few of the currently available types of network adapters 908.

The system architecture 900 may be coupled to storage 916 (e.g., a non-volatile storage area, such as magnetic disk drives, optical disk drives, a tape drive, etc.). The storage 916 may comprise an internal storage device or an attached or network accessible storage. Computer programs 906 in storage 916 may be loaded into the memory elements 904 and executed by a processor 902 in a manner known in the art. Storage 916 may also include disk virtual volume cache 180 instead of or in addition to other types of storage.

The system architecture 900 may include fewer components than illustrated, additional components not illustrated herein, or some combination of the components illustrated and additional components. The system architecture 900 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer program product comprising a computer-readable medium including a computer readable program, wherein the computer readable medium is a member of a set of computer readable media consisting of a semiconductor or solid state memory, magnetic tape, a removable computer diskette, a rigid magnetic disk, an optical disk, a magnetic storage medium, volatile memory devices, and non-volatile memory devices, wherein the computer readable program when executed on a computer causes the computer to:

receive a set of premigration messages, wherein a separate premigration message is received for each logical volume in a chain of logical volumes, wherein each of the premigration messages includes a unique message identifier shared by the premigration messages in the chain, a chain member identifier, a total number of members in the chain, a logical volume identifier, and premigration indicators;

while processing the premigration messages in order of receipt of each of the premigration messages, receive a cancel message indicating that premigration of a logical volume in the chain is to be cancelled;

in response to determining that the logical volume whose premigration is to be cancelled has not already been transferred to physical storage media, cancel premigration of the logical volume by removing a premigration message for that logical volume from the set of premigration messages; and continue to premigrate each other logical volume in the chain of logical volumes in order of receipt.

2. The computer program product of claim 1, wherein the computer readable program when executed on a computer causes the computer to:

under control of a data cancel thread executing at a data mover, monitor for cancel messages;

recognize that a cancel message has been received; and issue the cancel message to a data move thread executing at the data mover.

3. The computer program product of claim 1, wherein, when processing the premigration messages in order of receipt, the computer readable program when executed on a computer causes the computer to:

for each of the premigration messages, attempt to transfer a logical volume identified in the premigration message from cache to the physical storage media; and return a status message indicating whether the premigration was successful.

4. The computer program product of claim 3, wherein the status message indicates that the premigration was successful even though the cancel message was received.

5. The computer program product of claim 3, wherein the status message indicates that the premigration failed because the cancel message was received.

6. The computer program product of claim 1, wherein each of the premigration messages indicates that a logical volume in the chain is to be transferred from cache to physical storage media.

7. A system, comprising:

hardware logic performing operations, the operations comprising:

receiving a set of premigration messages, wherein a separate premigration message is received for each logical volume in a chain of logical volumes, wherein each of the premigration messages includes a unique message identifier shared by the premigration messages in the chain, a chain member identifier, a total number of members in the chain, a logical volume identifier, and premigration indicators;

while processing the premigration messages in order of receipt of each of the premigration messages, receiving a cancel message indicating that premigration of a logical volume in the chain is to be cancelled;

in response to determining that the logical volume whose premigration is to be cancelled has not already been transferred to physical storage media, cancelling premigration of the logical volume by removing a premigration message for that logical volume from the set of premigration messages; and continuing to premigrate each other logical volume in the chain of logical volumes in order of receipt.

8. The system of claim 7, wherein the operations further comprise:

under control of a data cancel thread executing at a data mover, monitoring for cancel messages;

recognizing that a cancel message has been received; and issuing the cancel message to a data move thread executing at the data mover.

9. The system of claim 7, wherein operations for processing the premigration messages in order of receipt further comprise:

for each of the premigration messages,
attempting to transfer a logical volume identified in the premigration message from cache to the physical storage media; and
returning a status message indicating whether the premigration was successful.

10. The system of claim 9, wherein the status message indicates that the premigration failed because the cancel message was received.

11. The system of claim 9, wherein the status message indicates that the premigration was successful even though the cancel message was received.

12. The system of claim 7, wherein each of the premigration messages indicates that a logical volume in the chain is to be transferred from cache to physical storage media.

* * * * *